(12) United States Patent
Schneider et al.

(10) Patent No.: US 9,342,194 B2
(45) Date of Patent: May 17, 2016

(54) BIOMETRIC SCANNER HAVING A PROTECTIVE CONDUCTIVE ARRAY

(71) Applicant: QUALCOMM Incorporated, San Diego, CA (US)

(72) Inventors: John K. Schneider, Snyder, NY (US); Jack C. Kitchens, Tonawanda, NY (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/760,801

(22) Filed: Feb. 6, 2013

(65) Prior Publication Data

US 2013/0201153 A1 Aug. 8, 2013

Related U.S. Application Data

(60) Provisional application No. 61/595,335, filed on Feb. 6, 2012.

(51) Int. Cl.
*G06F 3/044* (2006.01)
*G06K 9/00* (2006.01)

(52) U.S. Cl.
CPC ............ *G06F 3/044* (2013.01); *G06K 9/0002* (2013.01); *G06K 9/00053* (2013.01)

(58) Field of Classification Search
CPC ............................................ H03K 2217/96011
See application file for complete search history.

(56) References Cited

U.S. PATENT DOCUMENTS

| | | | | |
|---|---|---|---|---|
| 3,622,989 A | * | 11/1971 | Dowdy, Sr. | ........ G06K 9/00013 382/126 |
| 6,002,786 A | * | 12/1999 | Hallibert | .............. A61B 5/1172 382/116 |
| 6,376,393 B1 | | 4/2002 | Newton et al. | |
| 6,411,726 B1 | | 6/2002 | Pires | |
| 2003/0090650 A1 | | 5/2003 | Fujieda | |
| 2003/0102874 A1 | | 6/2003 | Lane et al. | |
| 2007/0115263 A1 | * | 5/2007 | Taylor | ................... G06F 1/1616 345/169 |
| 2007/0279385 A1 | * | 12/2007 | Woolley | ............... G06F 3/0202 345/168 |
| 2008/0001787 A1 | * | 1/2008 | Smith | ................... G06F 3/0238 341/23 |
| 2010/0024573 A1 | * | 2/2010 | Daverman | .............. G01L 1/142 73/862.626 |
| 2010/0026649 A1 | * | 2/2010 | Shimizu | ............. G06F 3/04883 345/173 |
| 2012/0306619 A1 | * | 12/2012 | Longo | .................. G06K 9/0002 340/5.83 |

FOREIGN PATENT DOCUMENTS

KR 20110063643 A 6/2011

OTHER PUBLICATIONS

International Search Report and Written Opinion—PCT/US2013/024938—ISA/EPO—May 29, 2013.

* cited by examiner

*Primary Examiner* — Ryan A Lubit
(74) *Attorney, Agent, or Firm* — Weaver Austin Villeneuve & Sampson LLP

(57) ABSTRACT

A biometric scanner having a sensor and an array of conductive strands is disclosed. The sensor has at least one sensor electrode, and that sensor electrode may be a capacitance sensor, an electric field sensor, or an electroluminescent sensor. The array may have an electrical insulating material between adjacent ones of the conductive strands. The array serves to protect the sensor, and conduct through the array information about the electrical characteristics of a biometric object.

12 Claims, 1 Drawing Sheet

BIOMETRIC SCANNER HAVING A PROTECTIVE CONDUCTIVE ARRAY

CROSS-REFERENCE TO RELATED APPLICATION

This application claims the benefit of priority to U.S. provisional patent application Ser. No. 61/595,335, filed on Feb. 6, 2012.

FIELD OF THE INVENTION

The present invention relates to biometric scanners that sense electrical characteristics of the biometric object (such as a finger) in order to obtain information about the biometric object.

BACKGROUND OF THE INVENTION

Since the 1800's biometric information has been collected from human fingers and hands by means of ink and paper. For the purposes of this document, the term fingerprint is used to mean the skin surface friction ridge detail of a single fingerprint, partial fingerprint or any portion of the skin surface friction ridge of up to and including the entire hand or foot. In recent years various electronic fingerprint scanning systems have been developed utilizing optical, capacitance, electric field, direct pressure, thermal, and acoustic methods. Methods based upon acoustics, ultrasound, capacitance, and electric field measurement have proven to be the most accurate, because they are virtually immune to the effects of grease, dirt, paint, ink and other substances that may by present on the friction ridge skin.

For illustrating the invention, we will refer to the biometric object as a finger, but it should be understood that the invention is not limited to fingers. When the biometric object is a finger, the desired information may be the location of the ridges and valleys of the fingerprint. Such location information can be compared to a database of location information in order to determine whether the fingerprint matches fingerprint information stored in the database for identification purposes. Or, the location information may be used to create an image of the fingerprint.

Existing devices that utilize the electrical characteristics of a linger to produce information about a fingerprint include fingerprint scanners that sense capacitance or an electric field, including those that rely on dielectric material or electroluminescent material. Biometric scanners that use an electric field and/or capacitance sensors to obtain information about a biometric surface, such as a fingerprint, are referred to herein as EF/C Biometric Scanners. Existing EF/C Biometric Scanners are susceptible to damage caused by mechanical abrasion and electrostatic discharge ("ESD").

EF/C Biometric Scanners may offer an advantage in that they may be able to provide improved imaging in cases where there may be poor acoustic impedance matching between the friction skin of the fingerprint and an ultrasound scanner's platen, such as may be encountered when the friction skin is very dry. Capacitance and electric field sensors are, however, prone to mechanical abuse and damage, and they are especially susceptible to damage from ESD.

SUMMARY OF THE INVENTION

The invention may be embodied as a biometric scanner having a sensor and an array of conductive strands. The sensor has at least one sensor electrode, and that sensor electrode may be a capacitance sensor, an electric field sensor, or an electroluminescent sensor. The array may have an electrically insulating material between adjacent ones of the conductive strands.

The array of conductive strands may be positioned to protect the sensor from a user. For example, the array may be positioned so that the sensor is covered by the array. The array has a first primary surface and a second primary surface. The first primary surface is positioned further from the sensor than the second primary surface. In this arrangement, each conductive strand has a longitudinal dimension along which electricity is conducted between the first primary surface of the array and a second primary surface of the array.

The sensor may have a plurality of sensor electrodes, and in such an arrangement, the strands may be arranged to have a pitch that is smaller than the pitch of the sensor electrodes. For example, the pitch of the strands may be not greater than half the pitch of the sensor electrodes.

BRIEF DESCRIPTION OF THE DRAWINGS

For a fuller understanding of the nature and objects of the invention, reference should be made to the accompanying drawings and the subsequent description. Briefly, the drawings are.

Figure 1:
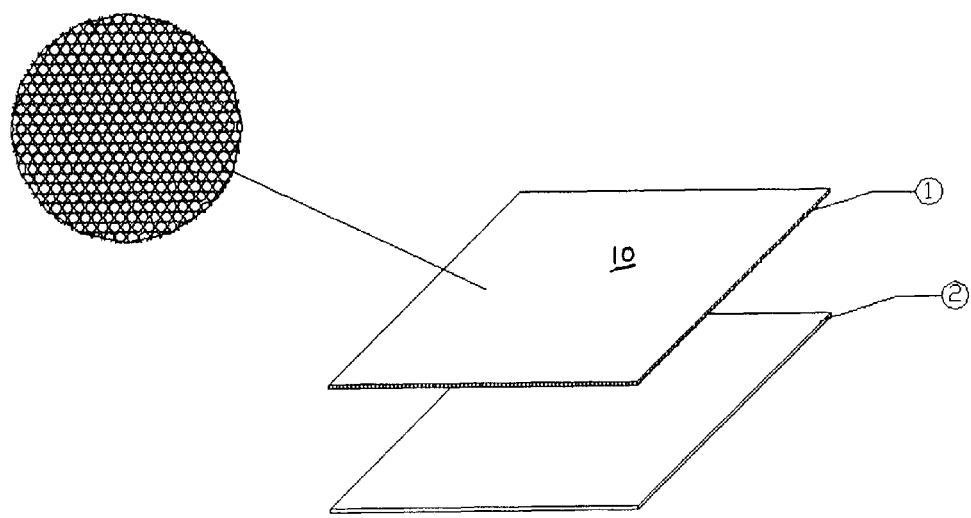
FIG. 1, which is an exploded perspective view showing components of an embodiment of the invention having an array of conductive strands 1 and a sensor array 2.

In the drawings, the reference numerals 1 through 10 and 12 point to certain aspects, as follows:

1 array of conductive strands (the "CS Array")
2 sensor array
3 substrate
4 sensor circuit
5 sensor electrode (may be 1, 2 or more per pixels)
6 finger
7 strand core (conductive)
8 strand cladding (dielectric insulating)
9 sensor dielectric covering
10 first primary surface
12 second primary surface.

FURTHER DESCRIPTION OF THE INVENTION

The invention may be employed to simultaneously protect a biometric scanner, such as a fingerprint scanner, from mechanical abuse and ESD, while allowing for interactive communication between the biometric scanner and a user. For example, the invention may provide a means of isolating the capacitance and/or electric field sensor through the use of a CS Array.

In an embodiment of the invention, conductive strands are placed between a sensor array and a user. In this manner, the user does not directly contact the sensor array, thereby preventing mechanical abrasion of the sensor array while allowing an electrical connection between the user and the sensor array to occur. A plurality of the conductive strands may be provided in the form of a CS Array.

The CS Array may be formed by placing an insulating matrix between the strands so that anisotropic conduction between a first primary surface and a second primary surface of the CS Array is the primary means of conduction through the CS array. Each conductive strand has a longitudinal dimension along which electricity is conducted between the first primary surface and the second primary surface of the CS array. For purposes of illustrating the invention, the first primary surface of the CS Array is the surface where a biometric object may be placed or very near to where a biometric object may be placed, and the second primary surface of the CS Array is further from the biometric object and close to the sensors of the EF/C Biometric Scanner.

Ends of the conductive strands in the CS array may be aligned with the sensors in the EF/C Biometric Scanner, and this may be accomplished by using a CS Array in which the strands center-to-center distance (i.e. "pitch") is smaller than that of the pitch of the sensors in the sensor array. In this manner, there will be redundant electrical contact with respect to each sensor between the user and the sensor array.

Having provided a general overview of the invention, additional details will now be given.

Figure 2:
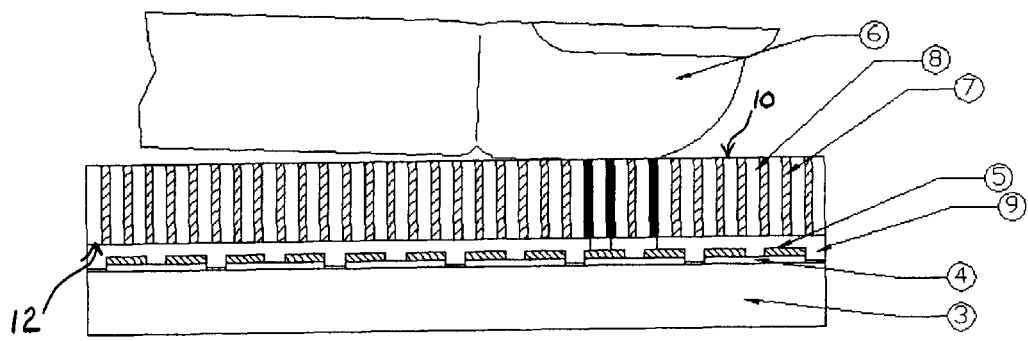
FIG. 2, which is a side view of an embodiment of the invention having a capacitance or electric field fingerprint sensor 2 and a conductive strand array 1.

FIG. 2 depicts an embodiment of the invention in which a CS Array 1 is laminated to a capacitance sensor array 2. In such an arrangement, the sensor array 2 is mechanically isolated from the surface 10 where a user interacts (for example, via the user's finger 6) with the sensor array 2. Electrical contact between objects on the surface 10 and the electrodes 5 of the sensor array 2 is maintained via the CS Array 1. In this manner, mechanical damage of the sensor array 2 may be avoided and instead imposed on the surface 10 of the CS Array, while maintaining the functional utility of the sensor array 2.

In the embodiment of the invention depicted in FIGS. 1 and 2, the sensor array 2 is a capacitance sensing array using approximately two electrodes 5 per sensing circuit 4 and a dielectric covering 9. The sensor array may be a TFT (thin-film-transistor) type on a glass substrate 3. The CS Array 1 may be in physical contact with the sensor array 2, such that one or more conductive strand cores 7 is in contact with the finger 6. As such, the CS Array 1 may be implemented so as to cover the sensor electrodes 5. In this manner a conductive connection between the finger 6 and the second primary surface 12 of the CS Array 1 may be established, and used by the sensor's electrodes 5 in conjunction with the sensor's dielectric covering 9.

The pitch of the conductive strands 7 in the CS Array 1 may be selected to be less than the pitch of the sensor electrodes 5. For example, when the pitch of the strands 7 is not greater than half the pitch of the sensor circuit 4, electrical alignment may be ensured to the sensor's electrodes 5, whether the sensor 5 utilizes two or more electrodes per measurement circuit or just one. Each conductive strand 7 may be surrounded longitudinally by a cladding material 8. The cladding material 8 may be an electrical insulator such as a glass or a plastic material. In this manner, each conductive strand 7 is electrically insulated from others of the strands 7, and this will minimize crosstalk between strands 7 so as to provide each sensor electrode 5 with a more accurate indication of the electrical characteristics of the object 6 residing on the first primary surface 10.

In another embodiment of the invention, an electric field sensor array is used in lieu of the capacitance scanner described above. In such an embodiment of the invention, an excitation electric field (such as a radio frequency excitation) emitted from the biometric object is transmitted via the strands 7 of the CS Array 1 toward the sensor's dielectric covering 9 and electrodes 5. By using a CS Array 1 interposed between the finger 6 and the sensor array 2, the electric field fingerprint sensor is afforded protection from mechanical abrasion present at the surface 10.

So far, the invention has been described with reference to capacitance and electric field sensors having multiple sensor electrodes. However, the invention is not limited to EF/C Biometric Scanners having multiple sensors. The method and manner of implementation to protect the sensor of an EF/C Biometric Scanner with a single capacitance electrode or a single electric-field electrode is similar to that described above for EF/C Biometric Scanners having multiple sensors.

The CS Array 1 may be a microchannel array (GCA), such as those available from Photonis USA of Sturbridge, Mass. A microchannel array is a glass capillary array that has been filled with or plated with a conductor. The conductive metal provides anisotropic electrical contact between ends of each capillary. Microchannel arrays are currently available with core-to-core pitches as small as 3 microns.

Those versed in the art will realize that use of a CS Array 1 can be used with an electroluminescent type fingerprint sensor. The generation of an electroluminescent image is similar to an electric field sensor, with the image detection means being an optical sensor that displays an image of the glowing phosphors within an electroluminescent sensor's image generation section. As such the inventive combination of a CS Array 1 and sensor described above can be used with an electroluminescent type fingerprint sensor, and similar benefits may be expected.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A biometric scanner, comprising:
   a capacitance sensor having at least one sensor electrode and a dielectric; and
   an array of conductive strands positioned to cover and protect the sensor electrode and the dielectric from a biometric object to be scanned and also allow an electrical connection between the biometric object and the sensor to occur, the array having electrically insulating cladding material between adjacent ones of the conductive strands wherein the at least one sensor electrode is electrically insulated from the array of conductive strands by the dielectric being disposed between the at least one sensor electrode and the array of conductive strands.

2. The biometric scanner of claim 1, wherein the array has a first primary surface and a second primary surface, the first primary surface being positioned further from the sensor than the second primary surface, and wherein each conductive strand has a longitudinal dimension along which electricity is conducted from one of the primary surfaces of the array to the other of the primary surfaces of the array.

3. The biometric scanner of claim 1, wherein the sensor has a plurality of sensor electrodes, and the strands are arranged to have a pitch that is smaller than the pitch of the sensor electrodes.

4. The biometric scanner of claim 3, wherein the pitch of the strands is not greater than half the pitch of the sensor electrodes.

5. A biometric scanner, comprising:
   an electric field sensor having at least one sensor electrode and a dielectric; and
   an array of conductive strands positioned to cover and protect the sensor electrode and the dielectric from a biometric object to be scanned and also allow an electrical connection between the biometric object and the sensor to occur, the array having electrically insulating cladding material between adjacent ones of the conductive strands wherein the at least one sensor electrode is electrically insulated from the array of conductive strands by the dielectric being disposed between the at least one sensor electrode and the array of conductive strands.

6. The biometric scanner of claim 5, wherein the array has a first primary surface and a second primary surface, the first primary surface being positioned further from the sensor than the second primary surface, and wherein each conductive strand has a longitudinal dimension along which electricity is conducted from one of the primary surfaces of the array to the other of the primary surfaces of the array.

7. The biometric scanner of claim 5, wherein the sensor has a plurality of sensor electrodes, and the strands are arranged to have a pitch that is smaller than the pitch of the sensor electrodes.

8. The biometric scanner of claim 7, wherein the pitch of the strands is not greater than half the pitch of the sensor electrodes.

9. A biometric scanner, comprising:
 an electroluminescent sensor having at least one sensor electrode and a dielectric; and
 an array of conductive strands positioned to cover and protect the sensor electrode and the dielectric from a biometric object to be scanned and also allow an electrical connection between the biometric object and the sensor to occur, the array having electrically insulating cladding material between adjacent ones of the conductive strands wherein the at least one sensor electrode is electrically insulated from the array of conductive strands by the dielectric being disposed between the at least one sensor electrode and the array of conductive strands.

10. The biometric scanner of claim 9, wherein the array has a first primary surface and a second primary surface, the first primary surface being positioned further from the sensor than the second primary surface, and wherein each conductive strand has a longitudinal dimension along which electricity is conducted from one of the primary surfaces of the array to the other of the primary surfaces of the array.

11. The biometric scanner of claim 9, wherein the sensor has a plurality of sensor electrodes, and the strands are arranged to have a pitch that is smaller than the pitch of the-sensor electrodes.

12. The biometric scanner of claim 11, wherein the pitch of the strands is not greater than half the pitch of the sensor electrodes.

* * * * *